United States Patent
Park et al.

(10) Patent No.: US 12,230,074 B2
(45) Date of Patent: Feb. 18, 2025

(54) APPARATUS, METHOD AND COMPUTER READABLE STORAGE MEDIUM FOR DIAGNOSING FAULT OF VEHICLE COMPONENT USING ACCELERATION SENSOR

(71) Applicants: HYUNDAI MOTOR COMPANY, Seoul (KR); KIA CORPORATION, Seoul (KR)

(72) Inventors: Tae Woong Park, Hwaseong-si (KR); Jae Hun Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 201 days.

(21) Appl. No.: 18/099,442

(22) Filed: Jan. 20, 2023

(65) Prior Publication Data
US 2024/0096142 A1    Mar. 21, 2024

(30) Foreign Application Priority Data
Sep. 16, 2022    (KR) .................. 10-2022-0116925

(51) Int. Cl.
*G07C 5/08*    (2006.01)
*G06N 20/00*    (2019.01)
*G07C 5/02*    (2006.01)

(52) U.S. Cl.
CPC .............. *G07C 5/02* (2013.01); *G06N 20/00* (2019.01)

(58) Field of Classification Search
CPC ....... G07C 5/08; G06N 20/00; G01M 99/004; G01M 13/04; G01M 13/00; B60B 27/00
See application file for complete search history.

(56) References Cited

U.S. PATENT DOCUMENTS

| | | | |
|---|---|---|---|
| 10,112,444 B2* | 10/2018 | Takahashi | B60C 19/00 |
| 11,780,273 B2* | 10/2023 | Singh | B60C 23/0408 |
| | | | 701/34.4 |
| 2008/0234964 A1* | 9/2008 | Miyasaka | G01M 13/04 |
| | | | 702/113 |
| 2008/0306649 A1 | 12/2008 | Im | |
| 2011/0118989 A1* | 5/2011 | Morinaga | B60C 11/24 |
| | | | 702/34 |

(Continued)

FOREIGN PATENT DOCUMENTS

| | | |
|---|---|---|
| CN | 108168891 B | 6/2018 |
| CN | 111829782 A | 10/2020 |

(Continued)

*Primary Examiner* — Tan Q Nguyen
(74) *Attorney, Agent, or Firm* — MORGAN, LEWIS & BOCKIUS LLP

(57) ABSTRACT

An apparatus for diagnosing a fault of a vehicle component, may include: a processor; a memory storing one or more programs configured to be executed by the processor; and the one or more programs include instructions for: an acceleration sensor for detecting an acceleration signal; feature extraction unit for extracting features related to a fault of a vehicle component from the detected acceleration signal; and a machine learning model for diagnosing a fault of the vehicle component based on the extracted features, wherein the machine learning model may be a model selected according to a preset evaluation index among a plurality of machine learning models trained based on training data sets.

19 Claims, 5 Drawing Sheets

(56) References Cited

U.S. PATENT DOCUMENTS

| | | | |
|---|---|---|---|
| 2020/0363296 A1* | 11/2020 | Westlund | ................ G06N 7/01 |
| 2021/0201602 A1 | 7/2021 | Im | |
| 2022/0041174 A1 | 2/2022 | Bunazawa | |

FOREIGN PATENT DOCUMENTS

| | | | | |
|---|---|---|---|---|
| JP | 2019-045241 A | | 3/2019 | |
| KR | 10-0145146 B1 | | 8/1998 | |
| KR | 10-0755391 B1 | | 9/2007 | |
| KR | 10-0795829 B1 | | 1/2008 | |
| KR | 10-2020-0037816 A | | 4/2020 | |
| KR | 10-2021-0093123 A | | 7/2021 | |
| WO | 2019/028269 A2 | | 2/2019 | |
| WO | WO2020/141677 | * | 9/2020 | ............. B60B 27/00 |

* cited by examiner

APPARATUS, METHOD AND COMPUTER READABLE STORAGE MEDIUM FOR DIAGNOSING FAULT OF VEHICLE COMPONENT USING ACCELERATION SENSOR

CROSS-REFERENCE TO RELATED APPLICATION(S)

This application claims benefit of priority to Korean Patent Application No. 10-2022-0116925 filed on Sep. 16, 2022 in the Korean Intellectual Property Office, the disclosure of which is incorporated herein by reference in its entirety.

TECHNICAL FIELD

The present application relates to an apparatus, method, and computer-readable storage medium for diagnosing a fault of a vehicle component using an acceleration sensor.

BACKGROUND

As the paradigm of the automobile industry approaches the era of autonomous driving, driver intervention in vehicles is decreasing, and accordingly, the importance of diagnosing a fault of a vehicle component installed in the vehicle is increasing.

In particular, among vehicle components, a wheel hub bearing is a very important component in which a rotating element mounted on a vehicle is connected to a non-rotating element coupled to a vehicle body through a rolling body (e.g., a rolling element) to rotatably support the vehicle with respect to the vehicle body.

When a fault (e.g., corrosion or indentation) occurs in the wheel hub bearing, the fault may cause noise and vibrations of the vehicle. Accordingly, a function for diagnosing the fault of the wheel hub bearing is required, but such a diagnosis function has not yet been implemented.

In particular, since noise or vibrations of a vehicle generated when a tire is faulty, are similar to that of the wheel hub bearing, it is difficult to determine whether the wheel hub bearing is faulty or the tire is faulty only by noise or vibrations.

SUMMARY

An aspect of the present disclosure is to provide an apparatus and method for diagnosing a fault of a vehicle component using an acceleration sensor, which can easily diagnose a fault of a vehicle component, and a computer-readable storage medium.

According to an aspect of the present disclosure, an apparatus for diagnosing a fault of a vehicle component is provided, the apparatus including: a processor; a memory storing one or more programs configured to be executed by the processor; and the one or more programs include instructions for: an acceleration sensor for detecting an acceleration signal; a feature extraction unit for extracting features related to a fault of a vehicle component from the detected acceleration signal; and a machine learning model for diagnosing a fault of the vehicle component based on the extracted features, wherein the machine learning model is a model selected according to a preset evaluation index among a plurality of machine learning models trained based on training data sets.

According to an aspect of the present disclosure, a method for diagnosing a fault of a vehicle component is provided, the method including: a first operation, in an acceleration sensor, of detecting an acceleration signal; a second operation, in a feature extraction unit, of extracting features related to a fault of a vehicle component from the detected acceleration signal; and a third operation, in a machine learning model, of diagnosing a fault of the vehicle component based on the extracted features, wherein the machine learning model is a model selected according to a preset evaluation index among a plurality of machine learning models trained based on training data sets.

According to an embodiment of the present disclosure, there is provided a computer-readable storage medium in which a program for executing the method on a computer is recorded.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
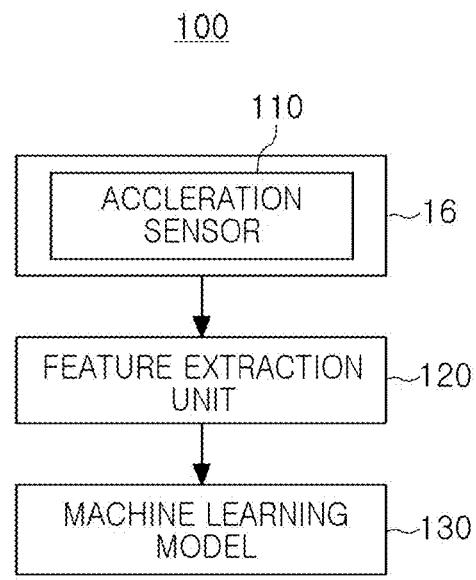
FIG. 1 is a block diagram of an apparatus for diagnosing a fault of a vehicle component using an acceleration sensor according to an embodiment of the present disclosure.

Hereinafter, embodiments in the present disclosure will be described with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the same reference numerals will be used throughout to designate the same or like elements, and the shapes and dimensions of elements may be exaggerated for clarity, and elements indicated by the same reference numerals in the drawings are the same elements.

In the present disclosure, a vehicle component is described as an exemplary wheel hub bearing, but is not necessarily limited thereto, and may be applied to all vehicle components in which a rotating element is connected to a non-rotating element via a rolling body (e.g., a rolling element, or the like).

Figure 2:
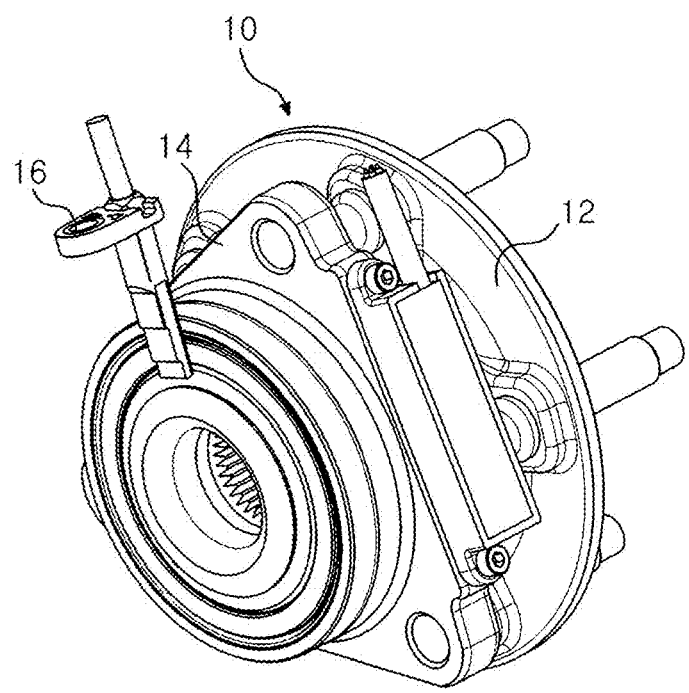
FIG. 2 is a view illustrating a wheel hub bearing as an example of a vehicle component according to an embodiment of the present disclosure, and a wheel speed sensor provided on one side of the wheel hub bearing and having an acceleration sensor embedded therein.

FIG. 1 is a block diagram of an apparatus for diagnosing a fault of a vehicle component using an acceleration sensor according to an embodiment of the present disclosure. FIG. 2 is a view illustrating a wheel hub bearing as an example of a vehicle component according to an embodiment of the present disclosure, and is a view illustrating a wheel speed sensor provided on one side of the wheel hub bearing and having a built-in acceleration sensor.

As illustrated in FIG. 1, an apparatus 100 for diagnosing a fault of a vehicle component may include an acceleration sensor 110, a feature extraction unit 120, and a machine learning model 130 provided in a wheel speed sensor 16.

Specifically, the acceleration sensor 110 is a sensor detecting an acceleration signal of a vehicle, and the acceleration signal may include an X-axis component, a Y-axis component, and a Z-axis component. The detected acceleration signal may be transmitted to the feature extraction unit 120. The acceleration sensor 110 may be provided in a wheel speed sensor mounted on an outer ring 14 of the wheel hub bearing and measuring a wheel speed.

As illustrated in FIG. 2, the wheel hub bearing 10 is a vehicle component in which a rotating element is connected to a non-rotating element in which a rotating element, which is a wheel hub 12, is composed of an outer ring 14, through a rolling body (e.g., a rolling element, or the like), so that the wheel may rotatably support the wheel with respect to a vehicle body. The wheel speed sensor 16 may be mounted on the outer ring 14, which is a non-rotating element of the wheel hub bearing 10 described above, and measure a wheel speed, and the acceleration sensor 110 may be in the wheel speed sensor 16. Alternatively, according to an embodiment of the present disclosure, the acceleration sensor 110 may be mounted on a strut. The acceleration sensor 110 mounted on the strut may also be a 3-axis acceleration sensor capable of detecting acceleration signals of an X-axis component, a Y-axis component, and a Z-axis component.

Meanwhile, the feature extractor 120 may extract features related to faults of vehicle components from the acceleration signal. The extracted features may be transmitted to the machine learning model 130.

According to an exemplary embodiment of the present disclosure, the feature extraction unit 120 may include a processor (e.g., computer, microprocessor, CPU, ASIC, circuitry, logic circuits, etc.) and an associated non-transitory memory storing software instructions which, when executed by the processor, performs various functions described hereinafter. Herein, the memory and the processor may be implemented as separate semiconductor circuits. Alternatively, the memory and the processor may be implemented as a single integrated semiconductor circuit. The processor may embody one or more processor(s).

To extract the above-described features, the feature extraction unit 120 performs a Fourier transform on each of the X-axis, Y-axis, and Z-axis components of the acceleration signal. Next, the feature extraction unit 120 extracts magnitudes of acceleration signals corresponding to each of frequencies having a predetermined interval within a preset frequency domain of the Fourier-transformed acceleration signal on each of the X-axis, Y-axis, and Z-axis components. Then, the feature extraction unit 120 may extract magnitudes of the acceleration signal, an average of the magnitudes of the acceleration signal, standard deviation of the magnitudes of the acceleration signals, and dispersion of the magnitudes of the acceleration signal on each of the X-axis, Y-axis, and Z-axis components with the above-described features.

For example, if an X-axis component of the acceleration signal is described, the feature extractor 120 performs a Fourier transform on the X-axis component of the acceleration signal. Next, for the X-axis component, the feature extraction unit 120 extracts magnitudes of acceleration signals corresponding to each of the frequencies (e.g., 200 Hz, 210 Hz, 220 Hz, ... 1200 Hz) having a predetermined interval (e.g., 10 Hz) in the preset frequency domain (e.g., 200 Hz to 1200 Hz) of the Fourier-transformed acceleration signal. Thereafter, the feature extraction unit 120 may extract magnitudes of acceleration signal, an average of the magnitudes of the acceleration signals, standard deviation of the magnitudes of the acceleration signals, and dispersion of the magnitudes of the acceleration signals for the X-axis component as the above-described features. In this case, the number of features extracted from the X-axis component of the acceleration signal may be 103.

The above-described features may be equally extracted from the Y-axis component and the Z-axis component of the acceleration signal, and the total number of features for all of the X-axis component, Y-axis component, and Z-axis component of the acceleration signal may be 309. It should be noted that the specific number of the above-described features is merely an example to help the understanding of the present disclosure, and may be modified according to the needs of those skilled in the art.

Meanwhile, according to an embodiment of the present disclosure, the feature extraction unit 120 may perform a Fourier transform on only an acceleration signal for a time domain in a steady state among the acceleration signals. Therefore, for example, if the vehicle is driven from 0 seconds to 25 seconds, only the acceleration signal for the time domain section between 5 seconds and 20 seconds (i.e., the time domain in a steady state) may be extracted and Fourier transformed. This is because transient sections between 0 seconds and 5 seconds and between 20 seconds and seconds are excluded.

In addition, according to an embodiment of the present disclosure, the above-described preset frequency domain may be 200 Hz to 1200 Hz. That is, according to an experiment, when the vehicle component is a wheel hub bearing, faults (e.g., corrosion, indentation, or the like) of the wheel hub bearing occur in a frequency domain between 200 Hz and 1200 Hz. Such a preset frequency domain can be known through short-time Fourier transform (STFT) or a spectrogram.

Figure 3A:
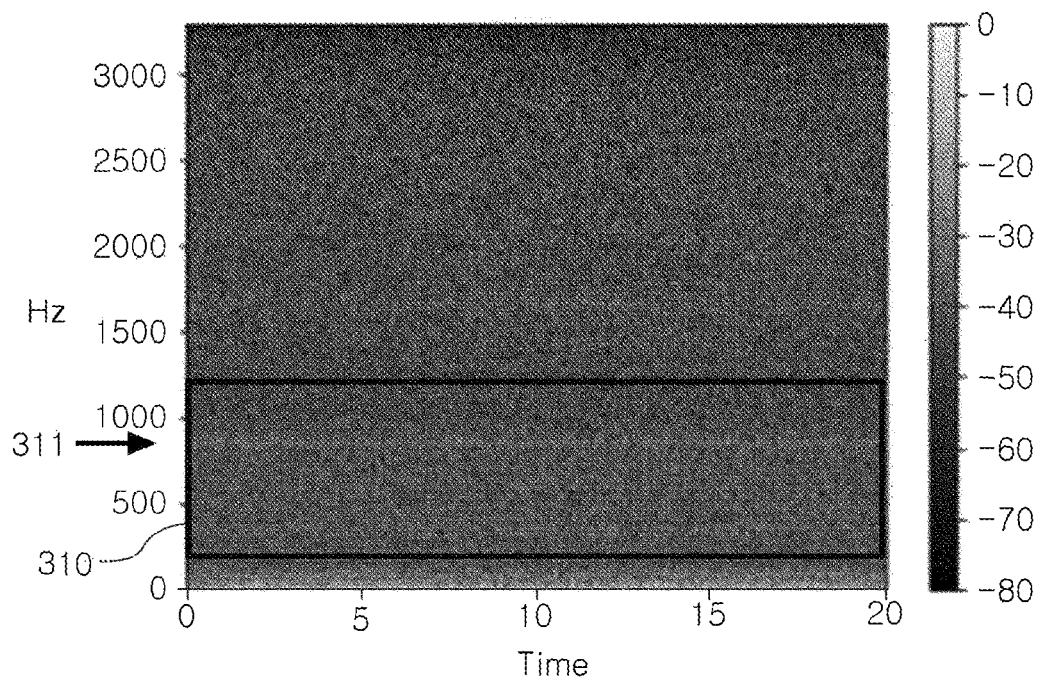
FIG. 3($a$) and FIG. 3($h$) exemplarily illustrate a conversion result of a spectrogram of an acceleration signal and a Short-Time Fourier transform (STFT) of an acceleration signal illustrated according to an embodiment of the present disclosure, and a frequency of an acceleration signal generated by a fault of a wheel hub bearing installed on a left side of a front wheel.
Figure 3B:
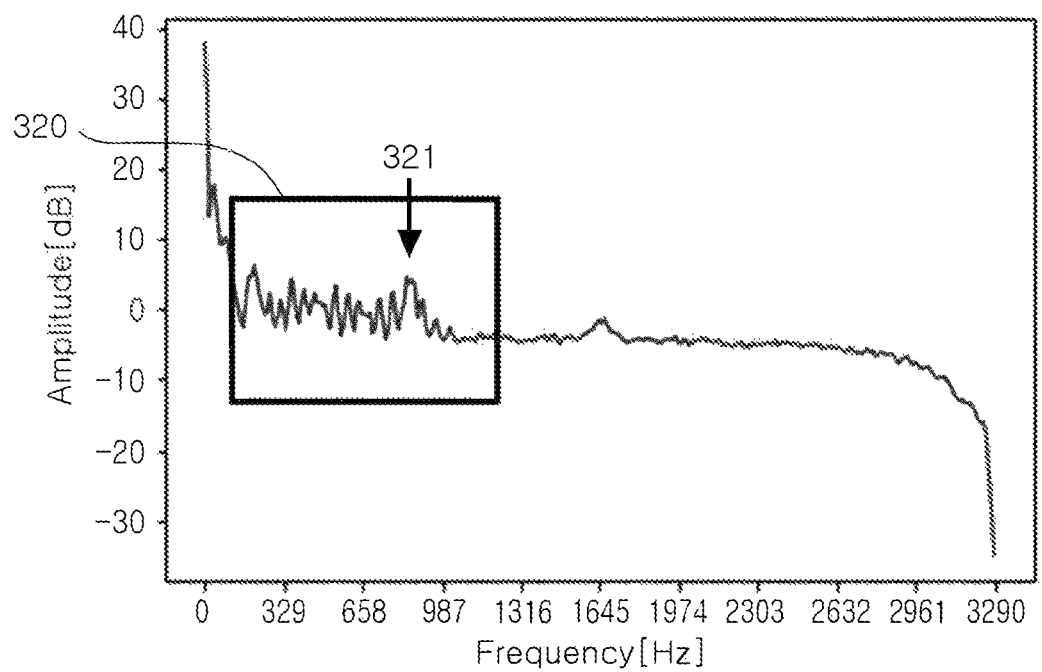

FIG. 3(a) and FIG. 3(b) exemplarily illustrate a frequency of the acceleration signal generated by a fault of a wheel hub bearing installed on a left side of the front wheel as a spectrogram of the acceleration signal and a result of STFT transformation of the acceleration signal illustrated according to an embodiment of the present disclosure. FIG. 3(a) illustrates a spectrogram of the Y-axis component (longitudinal direction) of the acceleration signal, and a result of STFT transformation of the Y-axis component (longitudinal direction) of the acceleration signal.

From the spectrogram of the acceleration signal illustrated in FIG. 3(a), it can be seen that a thin line is generated due to a fault of the wheel hub bearing at a frequency 311 of approximately 900 Hz. In addition, similarly, even in the result of STFT transformation of the acceleration signal illustrated in FIG. 3(b), it can be seen that an amplitude increases due to a fault of the wheel hub bearing at a frequency 321 of about 900 Hz.

According to the results obtained through an experiment, the fault of the wheel hub bearing may occur in a frequency domain between 200 Hz and 1200 Hz of the acceleration signal (refer to reference numerals 310 and 320). It is the same as the X-axis component and the Z-axis component of the acceleration signal. As described above, the frequency domain of the acceleration signal in which a fault of the wheel hub bearing occurs can be known through the STFT transformation or the spectrogram.

Finally, the machine learning model 130 may diagnose a fault of a vehicle component based on the above-described characteristics. That is, the machine learning model 130 may diagnose whether a vehicle component has a fault or no fault based on the above-described characteristics.

Meanwhile, the above-described machine learning model 130 may be a model selected according to a preset evaluation index among a plurality of machine learning models trained based on training data sets.

According to an exemplary embodiment of the present disclosure, the machine learning model 130 may include a processor (e.g., computer, microprocessor, CPU, ASIC, circuitry, logic circuits, etc.) and an associated non-transitory memory storing software instructions which, when executed by the processor, performs various functions described hereinafter. Herein, the memory and the processor may be implemented as separate semiconductor circuits. Alternatively, the memory and the processor may be implemented as a single integrated semiconductor circuit. The processor may embody one or more processor(s).

Here, training data sets are required for learning of a plurality of machine learning models, and test data sets are required to select one of a plurality of machine learning models that have been trained.

Each of the above-described training data sets and test data sets may be a combination of a data set including features extracted from an acceleration signal detected in a state in which a faulty vehicle component is mounted and a data set including features extracted from an acceleration signal detected in a state in which a non-faulty vehicle component is mounted.

The above-described training data sets and test data sets may be obtained in the following manner. It will be apparent to those skilled in the art that the following methods are merely examples for helping understanding of the present disclosure, and that modifications may be made.

Specifically, a faulty wheel hub bearing is mounted on a front left (FL) and a rear left (RL), and a non-faulty wheel hub bearing is mounted on a front right (FR) and a rear right (RR). Thereafter, the feature extraction unit 120 extracts feature points from an acceleration signal of an acceleration sensor provided on each of the front left (FL), rear left (RL), front right (FR) and rear right (RR) sides over 16 times. Here, 64 data sets (16 measurement times×4 acceleration sensors) can be obtained. Each of the 64 data sets can be labeled as faulty or non-faulty.

In addition, a non-faulty wheel hub bearing is mounted on each of the front left (FL), rear left (RL), front right (FR) and rear right (RR). Thereafter, the feature extraction unit 120 extracts feature points from an acceleration signal of the front left (FL), rear left (RL), front right (FR), and rear right (RR) sides over 50 times. Here, 200 data sets (50 measurements times×4 acceleration sensors) can be obtained. Likewise, each of the 200 data sets can be labeled as faulty or non-faulty.

The total number of data sets that can be obtained through the above-described process may be 264. A portion of the total 264 data sets, for example, 70%, may be used as a training data set for training, and the remaining 30% may be used as a test data set for evaluation. It should be noted that the above-described number of measurements or the number of data sets is merely an example for helping in an understanding of the present disclosure, and may be modified according to the needs of those skilled in the art.

Meanwhile, a preset evaluation index is required to select one model from among a plurality of machine learning models, and as illustrated in Table 1 below, the preset evaluation index may include at least one of accuracy, recall, and precision.

That is, a machine learning model in which at least one of accuracy, recall, and precision among the plurality of machine learning models is equal to or greater than a preset reference value on each thereof may be selected as the above-described machine learning model 130.

Here, accuracy refers to accuracy of fault diagnosis of the machine learning model based on the above-described test data sets, recall refers to a ratio of test data sets diagnosed as having no faults by a machine learning model among test data sets including features extracted from an acceleration signal detected in a state in which a non-faulty vehicle component is mounted, and precision refers to a ratio of test data sets including features extracted from an acceleration signal detected in a state in which non-faulty vehicle component is mounted among test sets diagnosed as having no faults by the machine learning model. In addition, it should be noted that the preset reference value can be appropriately set according to the needs of those skilled in the art, and the present disclosure is not limited to specific numerical values.

TABLE 1

| | |
|---|---|
| Accuracy | (N11 + N22)/(N11 + N12 + N21 + N22) |
| Recall | N11/(N11 + N12) |
| Precision | N11/(N11 + N21) |

In Table 1, N11 may be a number of test data sets diagnosed as having no faults by a machine learning model, among test data sets including features extracted from an acceleration signal detected in a state in which a vehicle component having no fault is mounted.

In Table 1, N12 may be the number of test data sets diagnosed as having faults by a machine learning model among test data sets including features extracted from an acceleration signal detected in a state in which non-faulty vehicle component is mounted.

In Table 1, N21 may be the number of test data sets diagnosed as having faults by a machine learning model among test data sets including features extracted from an acceleration signal detected in a state in which a faulty vehicle component is mounted.

In Table 1, N22 may be the number of test data sets diagnosed as having faults by a machine learning model among test data sets including features extracted from an acceleration signal detected in a state in which a faulty vehicle component is mounted.

Table 2 below exemplarily illustrates accuracy, recall, and precision obtained for various machine learning models. In Table 2, as machine learning models, a machine learning model using a logistic regression algorithm, a support vector machine (SVM) algorithm, a decision tree algorithm, a random forest algorithm, and an XGBoost algorithm is illustrated, but it will be understood by those skilled in the art that is the present disclosure not limited to the examples illustrated in Table 2.

TABLE 2

| Machine learning model | Accuracy | Precision | Recall |
|---|---|---|---|
| Logistic Regression | 1.0000 | 1.0000 | 1.0000 |
| SVM | 1.0000 | 1.0000 | 1.0000 |
| Decision Tree | 0.9875 | 0.9932 | 0.9286 |
| Random Forest | 0.9750 | 0.9865 | 0.8750 |
| XGBoost | 0.9875 | 0.9932 | 0.9286 |

As illustrated in Table 2, in the case of a machine learning model using a logistic regression algorithm and a support vector machine (SVM) algorithm, Accuracy, Recall, and Precision are all 1, and accordingly, the machine learning model using the logistic regression or support vector machine algorithm may be selected.

As described above, according to an embodiment of the present disclosure, a fault of a vehicle component can be easily diagnosed using a machine learning model selected based on a preset evaluation index among a plurality of machine learning models and an acceleration signal.

Figure 4:
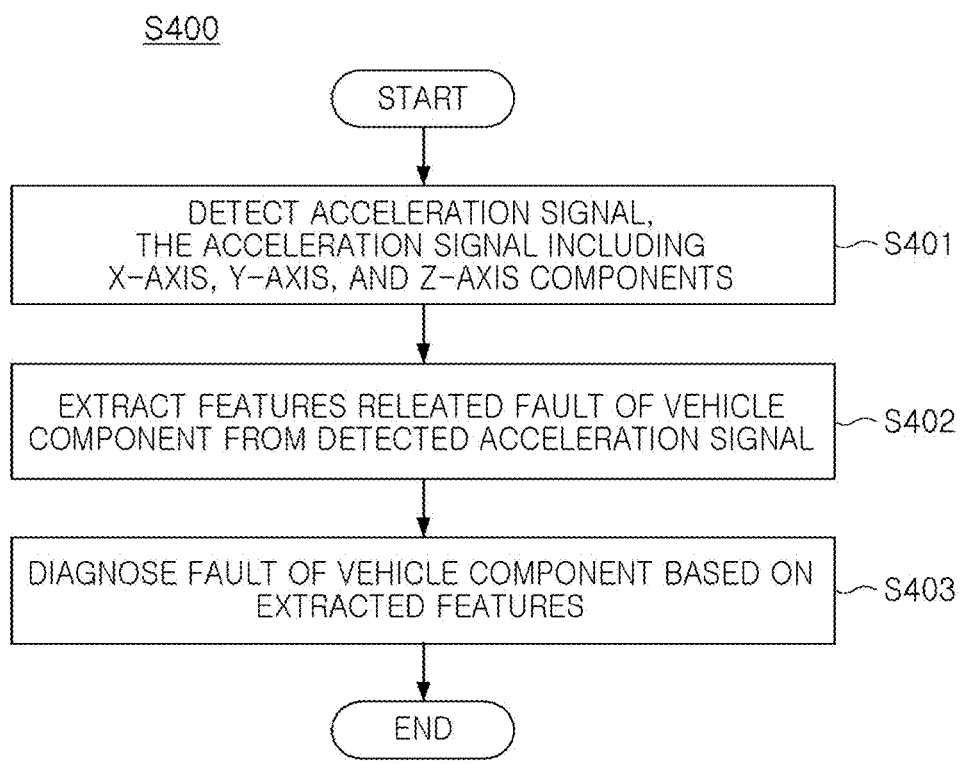
FIG. 4 is a flowchart illustrating a method for diagnosing a fault of a vehicle component using an acceleration sensor according to an embodiment of the present disclosure.
Figure 5:
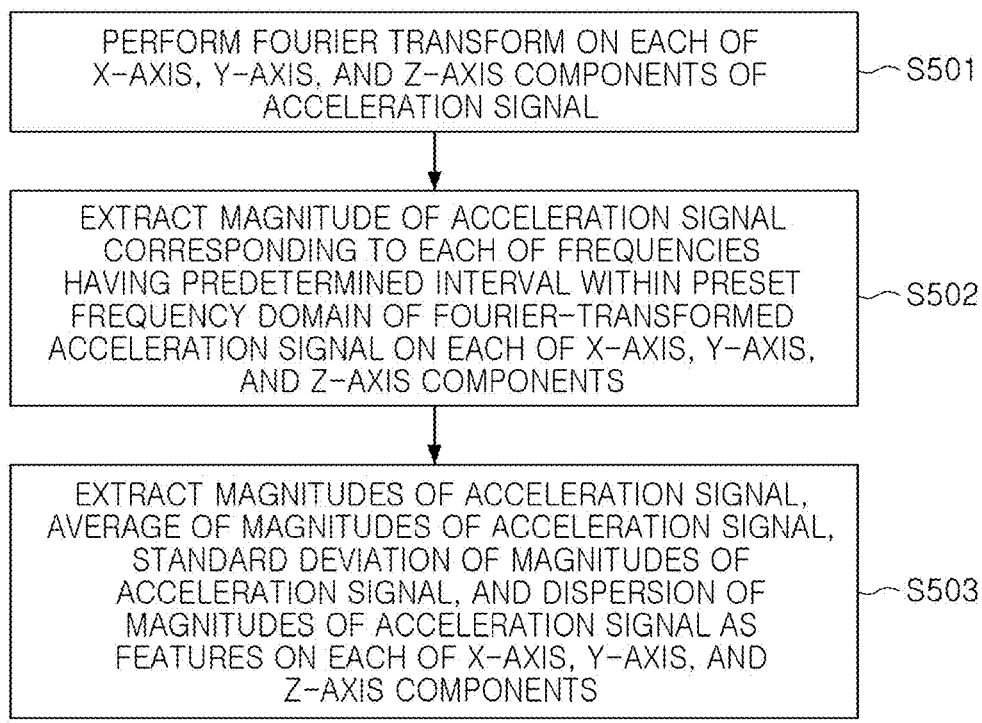
FIG. 5 is a flowchart illustrating operation 402 of FIG. 4.

Meanwhile, FIG. 4 is a flowchart illustrating a method for diagnosing a fault of a vehicle component using an acceleration sensor according to an embodiment of the present disclosure. FIG. 5 is a flowchart for specifying the operation 402 of FIG. 4.

Hereinafter, a method (S400) for diagnosing a fault of a vehicle component using an acceleration sensor according to an embodiment of the present disclosure will be described with reference to FIGS. 1 to 4.

Referring to FIGS. 1 to 4, a method S400 for diagnosing a fault of a vehicle component using an acceleration sensor according to an embodiment of the present disclosure may be started by detecting an operation of detecting an acceleration signal of the vehicle by the acceleration sensor 110 (S401).

Here, the acceleration signal may include an X-axis component, a Y-axis component, and a Z-axis component. The detected acceleration signal may be transmitted to the feature extraction unit 120. As described above, the acceleration sensor 110 may be provided in a wheel speed sensor mounted on the outer ring 14 of the wheel hub bearing and measuring a wheel speed, or may be mounted on a strut.

Next, the feature extraction unit 120 may extract features from an acceleration signal (S402). The extracted features may be transmitted to the machine learning model 130.

The above-described operation S402 may include operations S501 to S503 as illustrated in FIG. 5.

Specifically, the feature extraction unit 120 may perform a Fourier transform on each of the X-axis, Y-axis, and Z-axis components of the acceleration signal (S501).

Next, the feature extraction unit 120 may extract the magnitudes of the acceleration signals corresponding to each of frequencies having a predetermined interval within a preset frequency domain of the Fourier-transformed acceleration signal on each of the X-axis, Y-axis, and Z-axis components (S502).

According to an embodiment of the present disclosure, the preset frequency domain is 200 Hz to 1200 Hz, and it is as described above that a preset interval is 10 Hz.

Thereafter, the feature extraction unit 120 may extract magnitudes of an acceleration signal, an average of the magnitudes of the acceleration signal, standard deviation of the magnitudes of the acceleration signal, and dispersion of the magnitudes of the acceleration signal as the above-described features, on each of the X-axis, Y-axis, and Z-axis components (S503).

As described above, the above-described machine learning model 130 may be a model selected according to a preset evaluation index among a plurality of machine learning models trained based on training data sets.

As described above, training data sets are required for training of a plurality of machine learning models, and test data sets are required to select one of a plurality of machine learning models that have been trained.

As described above, each of the training data sets and the test sets may be a combination of a data set including features extracted from an acceleration signal detected in a stated in which a faulty vehicle component is mounted and a data set including features extracted from an acceleration signal detected in which a non-faulty vehicle component is mounted.

In addition, the preset evaluation index may include at least one of accuracy, recall, and precision, and as described above, a machine learning model in which at least one of the accuracy, recall, and precision, among a plurality of machine learning models is equal to or greater than a predetermined reference value on each thereof may be selected as the above-described machine learning model 130.

Finally, the machine learning model 130 may diagnose a fault of the vehicle component based on the extracted features (S403).

As described above, according to an embodiment of the present disclosure, the fault of the vehicle component can be easily diagnosed using a machine learning model selected based on a preset evaluation index among a plurality of machine learning models and an acceleration signal.

Figure 6:
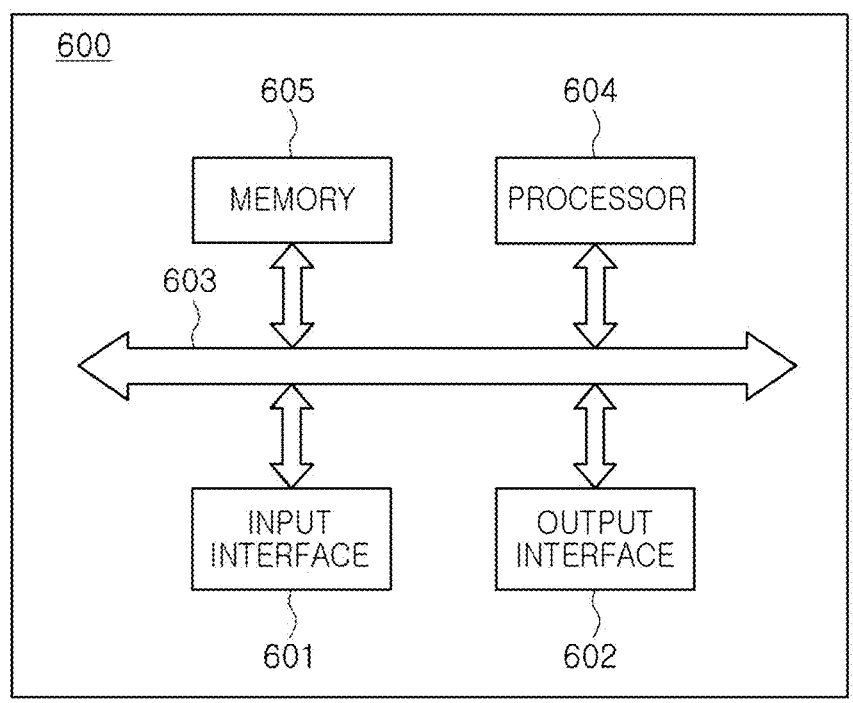
FIG. 6 is a block diagram of a computer device capable of fully or partially implementing an apparatus for diagnosing a fault of a vehicle component using an acceleration sensor according to an embodiment of the present disclosure.

Meanwhile, FIG. 6 is a block diagram of a computer device that can fully or partially implement an apparatus 100 for diagnosing a fault of a vehicle component according to an embodiment of the present disclosure, which may be applied to the apparatus 100 for diagnosing a fault of a vehicle component illustrated in FIG. 1.

As illustrated in FIG. 6, the computer device 600 may include an input interface 601, an output interface 602, a processor 604, and a memory 605, and the input interface 601, the output interface 602, the processor 604, and the memory 605 may be interconnected via a system bus 603.

In an embodiment of the present disclosure, the memory 605 is used to store a program, a command or a code, and the processor 604 may execute the program, the command or the code stored in the memory 505, control the input interface 601 to receive a signal, and control the output interface 602 to transmit a signal. The above-described memory 605 may include a read-only memory and a random access memory, and may provide instructions and data to the processor 604.

In an embodiment of the present disclosure, it should be understood that the processor 604 may be a central processing unit (CPU), another general-purpose processor, a digital signal processor (DSP), an application specific integrated circuit (ASIC), a field programmable gate array (FPGA), or other programmable logic devices, a discrete gate or a transistor logic device, a discrete hardware component, or the like. The general purpose processor may be a microprocessor, or the processor may be any conventional processor, or the like.

In one implementation process, each method of FIG. 1 may be achieved by an integrated logic circuit of hardware or an instruction in a form of software in the processor 604. The content of the method disclosed in relation to the embodiment of the present disclosure may be implemented to be performed and completed by a hardware processor, or may be performed and completed by a combination of hardware and software modules of the processor. The software module may be stored in a memory such as a random access memory, a flash memory, a read-only memory, a programmable read-only memory or an electrically erasable programmable memory, a register, and the like, and the processor 605 may read information from the memory 605 and implement the contents of the above-described method in combination with hardware. A code for implementing the feature extraction unit 120 and the machine learning model 130 illustrated in FIG. 1 may be stored in the above-describe memory 605. In order to avoid duplication, detailed descriptions thereof are omitted herein.

As set forth above, according to an embodiment of the present disclosure, a fault of a vehicle component may be easily diagnosed using a machine learning model selected based on a preset evaluation index among a plurality of machine learning models and an acceleration signal.

While the example embodiments have been illustrated and described above, it will be apparent to those skilled in the art that modifications and variations could be made without departing from the scope of the present disclosure as defined by the appended claims.

What is claimed is:

1. An apparatus for diagnosing a fault of a vehicle component, comprising:
   an acceleration sensor for detecting an acceleration signal;
   a feature extraction unit for extracting features related to a fault of a vehicle component from the detected acceleration signal; and
   a machine learning model for diagnosing a fault of the vehicle component based on the extracted features,
   wherein the machine learning model is a model selected according to a preset evaluation index among a plurality of machine learning models trained based on training data sets, and
   wherein the preset evaluation index comprises one of accuracy, recall, precision and a combination thereof.

2. The apparatus for diagnosing a fault of a vehicle component of claim 1, wherein the vehicle component is a wheel hub bearing,
   wherein the acceleration sensor is provided in a wheel speed sensor mounted on an outer ring of the wheel hub bearing and measuring a wheel speed, or mounted on a strut.

3. The apparatus for diagnosing a fault of a vehicle component of claim 1, wherein the feature extraction unit performs a Fourier transform on each of X-axis, Y-axis, and Z-axis components of the acceleration signal,
   extracts each of magnitudes of acceleration signals corresponding to each of frequencies having a predetermined interval within a preset frequency domain of the Fourier-transformed acceleration, on each of the X-axis, Y-axis, and Z-axis components, and
   extracts magnitudes of the acceleration signal, an average of the magnitudes of the acceleration signal, standard deviation of the magnitudes of the acceleration signal, and dispersion of the magnitudes of the acceleration signal as the features, on each of the X-axis, Y-axis, and Z-axis components.

4. The apparatus for diagnosing a fault of a vehicle component of claim 3, wherein the feature extraction unit performs a Fourier transform on only an acceleration signal for a time domain in a steady state among the acceleration signals.

5. The apparatus for diagnosing a fault of a vehicle component of claim 3, wherein the preset frequency domain is 200 Hz to 1200 Hz.

6. The apparatus for diagnosing a fault of a vehicle component of claim 3, wherein the preset frequency domain is determined based on at least one of a short-time Fourier transform (STFT) and a spectrogram of the acceleration signal.

7. The apparatus for diagnosing a fault of a vehicle component of claim 1,
   wherein the accuracy refers to accuracy of diagnosing a fault of a machine learning model based on test data sets,
   wherein the recall refers to a ratio of test data sets diagnosed as having no faults by the machine learning model among test data sets including features extracted from an acceleration signal detected in a state in which a non-faulty vehicle component is mounted,
   wherein the precision refers to a ratio of test data sets including features extracted from an acceleration signal detected in a state in which a non-faulty vehicle component is mounted, among test sets diagnosed as having no faults by the machine learning model.

8. The apparatus for diagnosing a fault of a vehicle component of claim 7, wherein in the machine learning model, at least one of the accuracy, the recall, and the precision is greater than or equal to a preset reference value on each thereof.

9. The apparatus for diagnosing a fault of a vehicle component of claim 7, wherein each of the training data sets and the test data sets is a combination of a data set including features extracted from an acceleration signal detected in a state in which a faulty vehicle component is mounted and a data set including features extracted from an acceleration signal detected in a state in which a non-faulty vehicle component is mounted.

10. A method for diagnosing a fault of a vehicle component, comprising:
    a first operation, in an acceleration sensor, of detecting an acceleration signal;
    a second operation, in a feature extraction unit, of extracting features related to a fault of a vehicle component from the detected acceleration signal; and
    a third operation, in a machine learning model, of diagnosing a fault of the vehicle component based on the extracted features,
    wherein the machine learning model is a model selected according to a preset evaluation index among a plurality of machine learning models trained based on training data sets, and
    wherein the preset evaluation index comprises one of accuracy, recall, precision and a combination thereof.

11. The method for diagnosing a fault of a vehicle component of claim 10, wherein the vehicle component is a wheel hub bearing,
    wherein the acceleration sensor is provided in a wheel speed sensor mounted on an outer ring of the wheel hub bearing and measuring a wheel speed, or is mounted on a strut.

12. The method for diagnosing a fault of a vehicle component of claim 10, wherein the second operation comprises
    an operation of performing a Fourier transform on each of X-axis, Y-axis, and Z-axis components of the acceleration signal;
    an operation of extracting each of magnitudes of acceleration signals corresponding to each of frequencies having a predetermined interval within a preset frequency domain of the Fourier-transformed acceleration signal on each of the X-axis, Y-axis, and Z-axis components; and an operation of extracting magnitudes of the acceleration signal, an average of the magnitudes of the acceleration signal, standard deviation of magnitudes of the acceleration signal, and dispersion of magnitudes of the acceleration signal as the features on each of the X-axis, Y-axis, and Z-axis components.

13. The method for diagnosing a fault of a vehicle component of claim 12, wherein the operation of performing a Fourier transform further comprises:

an operation of performing a Fourier transform on only an acceleration signal for a time domain in a steady state among the acceleration signals.

14. The method for diagnosing a fault of a vehicle component of claim 12, wherein the preset frequency domain is 200 Hz to 1200 Hz.

15. The method for diagnosing a fault of a vehicle component of claim 12, wherein the preset frequency domain is determined based on one of a short-time Fourier transform (STFT) and a spectrogram of the acceleration signal.

16. The method for diagnosing a fault of a vehicle component of claim 10, wherein the accuracy refers to accuracy of fault diagnosis of a machine learning model based on test data sets, the recall refers to a ratio of test data sets diagnosed as having no faults by the machine learning model among test data sets including features extracted from an acceleration signal detected in a state in which a non-faulty vehicle component is mounted, and the precision refers to a ratio of test data sets including features extracted from an acceleration signal detected in a state in which a non-faulty vehicle component is mounted among test sets diagnosed as having no faults by the machine learning model.

17. The method for diagnosing a fault of a vehicle component of claim 16, wherein in the machine learning model, at least one of the accuracy, the recall, and the precision is equal to or greater than a preset reference value on each thereof.

18. The method for diagnosing a fault of a vehicle component of claim 16, wherein each of the training data sets and the test data sets is a combination of a data set including features extracted from an acceleration signal detected in a state in which a faulty vehicle component is mounted and a data set including features extracted from an acceleration signal detected in a state in which a faulty vehicle component is mounted.

19. A computer-readable storage medium in which a program for executing the method according to claim 10 by a computer is recorded.

* * * * *